(12) United States Patent
Chang

(10) Patent No.: US 6,480,378 B2
(45) Date of Patent: Nov. 12, 2002

(54) MULTI-ANGLE PLACEMENT RACK OF PERSONAL DIGITAL ASSISTANT FOR USE IN AN AUTOMOBILE

(76) Inventor: Dean Chang, 4F, No. 4, Lane 235, Boa Chaio Road, Hsin Tien City, Taipei (TW)

( * ) Notice: Subject to any disclaimer, the term of this patent is extended or adjusted under 35 U.S.C. 154(b) by 22 days.

(21) Appl. No.: 09/826,883

(22) Filed: Apr. 6, 2001

(65) Prior Publication Data

US 2002/0145850 A1 Oct. 10, 2002

(51) Int. Cl.⁷ .................................................. G06F 1/16
(52) U.S. Cl. ...................... 361/686; 361/687; 439/529; 379/446; 455/569
(58) Field of Search .............................. 361/686, 687, 361/683; 379/446, 454, 455, 420, 447, 426, 433; 455/90, 550, 575, 569, 128, 345, 346, 347, 348, 351, 127, 99, 572, 573; 439/344, 529, 350, 352, 662, 664, 668, 669; 224/42.42, 42.45 R, 42.43, 42.01, 277, 281; 320/115, 107; 363/146

(56) References Cited

U.S. PATENT DOCUMENTS

| | | | | |
|---|---|---|---|---|
| 5,086,958 A | * | 2/1992 | Nagy | 224/42.42 |
| 5,839,919 A | * | 11/1998 | Chen | 439/529 |
| 5,859,628 A | * | 1/1999 | Ross et al. | 345/173 |
| 6,058,184 A | * | 5/2000 | Frank | 379/420 |
| 6,138,041 A | * | 10/2000 | Yahia | 455/569 |
| 6,140,934 A | * | 10/2000 | Lam | 340/815.4 |
| 6,157,163 A | * | 12/2000 | Blackwood | 320/115 |
| 6,312,284 B1 | * | 11/2001 | Tsay | 439/529 |
| 6,366,672 B1 | * | 4/2002 | Tsay | 379/446 |

\* cited by examiner

Primary Examiner—Darren Schuberg
Assistant Examiner—Michael Datskovsky
(74) Attorney, Agent, or Firm—Rosenberg, Klein & Lee

(57) ABSTRACT

The present invention relates to a multi-angle placement rack of a personal digital assistant for use in an automobile and, more particularly, to a multi-angle placement rack capable of matching a personal digital assistant with various brands and kinds of automobiles to facilitate use. The present invention comprises a placement seat, a first main body, and a second main body. The placement seat is capable of rotating and adjusting various angles of elevation. A PDA can be placed on the placement seat, which can be replaced to match different kinds of PDAs. The bottom of the placement seat joins the first main body. The first main body extends to the second main body, which can be plugged into a lighter hole of an automobile, thereby charging the PDA. The second main body is retractable to match different depths of lighter holes in various brands and kinds of automobiles.

7 Claims, 5 Drawing Sheets

MULTI-ANGLE PLACEMENT RACK OF PERSONAL DIGITAL ASSISTANT FOR USE IN AN AUTOMOBILE

FIELD OF THE INVENTION

The present invention relates to a multi-angle placement rack of a personal digital assistant (PDA) for use in an automobile and, more particularly, to a multi-angle placement rack capable of matching a PDA with various kinds of automobiles to facilitate use.

BACKGROUND OF THE INVENTION

A personal digital assistant (PDA) is a new kind of portable device. Its volume is much smaller than that of a notebook computer so that it can be placed on a palm and operated. Recently, the PDAs have been much valued, and more and more people start to use them.

A PDA has many functions. For instance, it can store thousands of pieces of personal information including address lists, schedules, agenda, memos, and so on. When one needs to find out somebody's telephone number, the PDA can quickly find out the required data for him, and it is not necessary for him to browse a notebook in a great bustle. When one needs to look up data of business cards, it is not necessary for him to search in a business card clip sweatily. All he needs to do is to click the PDA twice to exactly and quickly find out previously inputted data of business cards.

In addition to the above basic functions, most PDAs can link with a computer. For instance, electronic mails that have not been read at work can be transferred to a PDA to be read and replied on one's commuting ways. Some PDAs can install various kinds of application programs such as spreadsheets, electronic maps, text editors, electronic books, and even games and global positioning and guiding systems.

Additionally, some PDAs have built-in wireless communication modules. In addition to being used as beepers, they can also receive real-time information such as stock market news, traffic statuses, weather predictions, real-time news, and so on. In the future, it is hopefully that PDAs can be combined with mobile phones.

FIG. 1 shows the structures of a prior art PDA 10 and its receiving seat 11. The receiving seat 11 has a receiving groove 12 thereon, which can be used to receive the PDA 10. The receiving seat 11 has a press button 13 near the front edge thereof. The press button 13 is pressed so that the PDA 10 can be conveniently taken out for use.

However, the above PDA 10 uses batteries of limited electricity. Because existent PDAs cannot be combined with an automobile, they cannot use electricity from the automobile. Therefore, a driver cannot use a lot of functions of the PDA 10 when driving an automobile.

Accordingly, the above prior art PDA has inconvenience and drawbacks in practical use. The present invention aims to resolve the above problems in the prior art.

Summary of the invention

The primary object of the present invention is to provide a multi-angle placement rack of a PDA for use in an automobile. The placement rack can effectively provide stable electricity for a PDA so that a driver can use spreadsheets, electronic maps, text editors, electronic books, and even games and global positioning and guiding systems of the PDA. Moreover, when a wireless communication module is built in the PDA, in addition to being used as a beeper, the PDA can also receive real-time information such as stock market news, traffic statuses, weather predictions, real-time news, and so on, hence facilitating use of the driver.

To achieve the above object, the present invention provides a multi-angle placement rack of a PDA for use in an automobile. The placement rack comprises a placement seat, a first main body, and a second main body. The placement seat is capable of rotating and adjusting various angles of elevation. A PDA can be placed on the placement seat, which can be replaced to match different kinds of PDAs. The bottom of the placement seat joins the first main body. The first main body extends to the second main body, which can be plugged into a lighter hole of an automobile, thereby charging the PDA. The second main body is retractable to match different depths of lighter holes of various brands and kinds of automobiles.

The various objects and advantages of the present invention will be more readily understood from the following detailed description when read in conjunction with the appended drawing, in which:

DETAILED DESCRIPTION OF THE PREFERRED EMBODIMENTS

Figure 1:
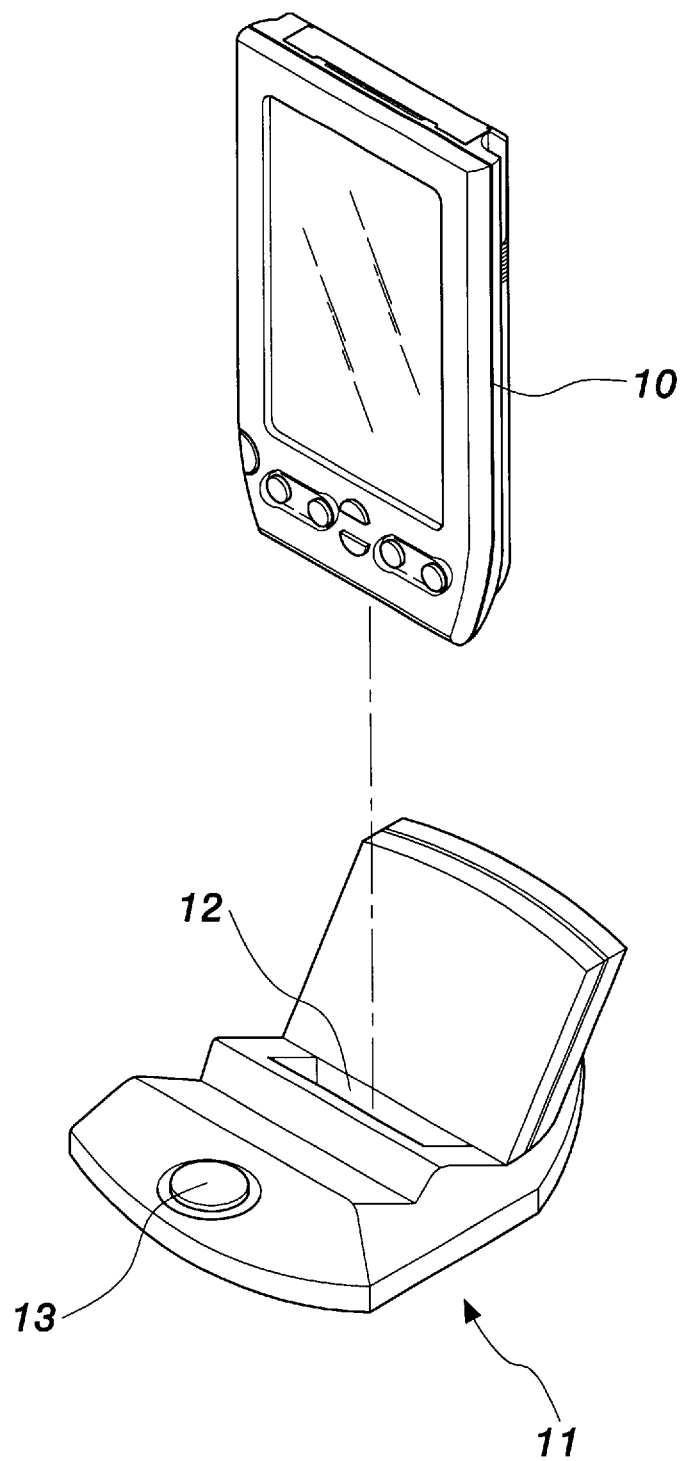
FIG. 1 is an exploded perspective view of a prior art personal digital assistant and its receiving seat.
Figure 2:
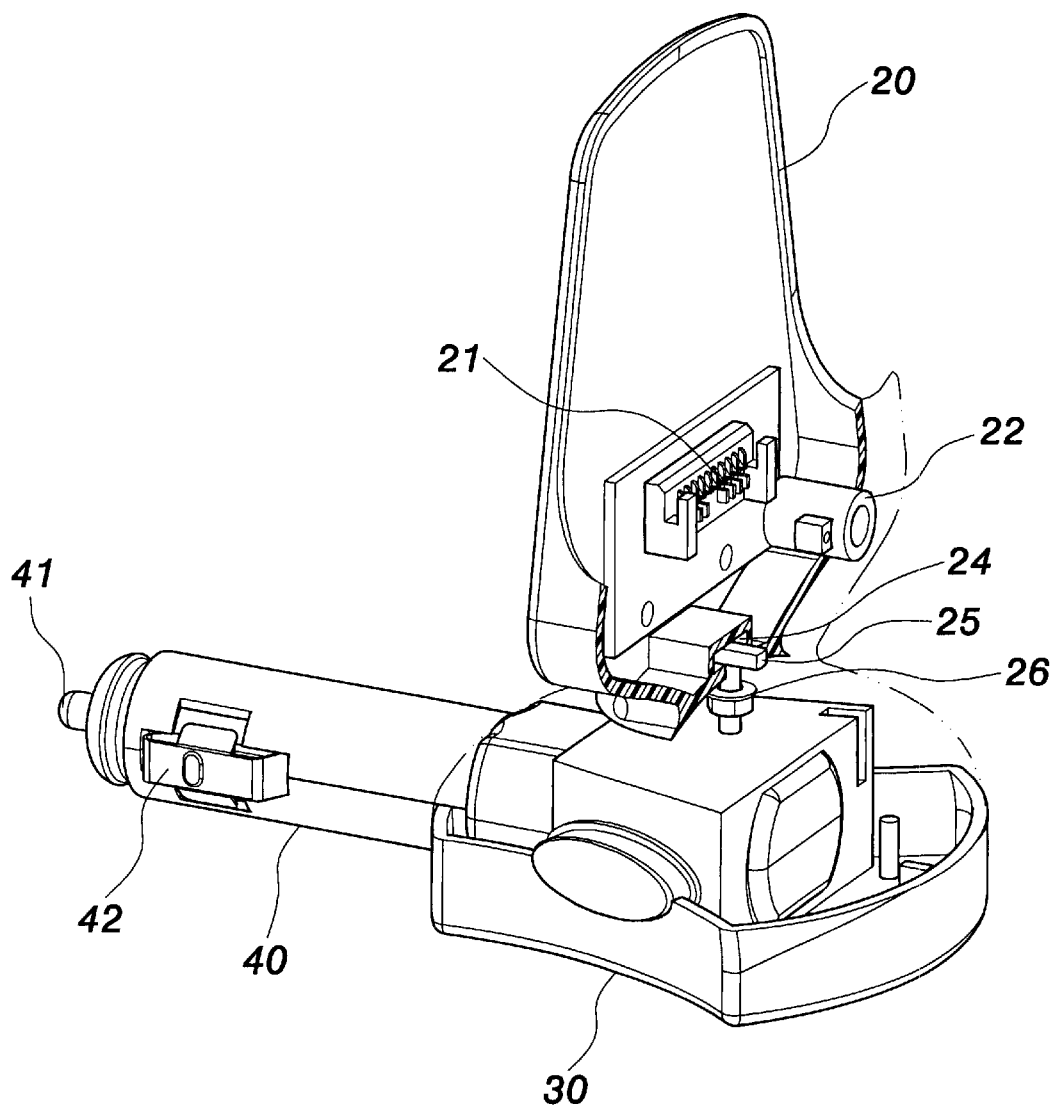
FIG. 2 is a perspective view of the placement rack and the first main body of the present invention.
Figure 3:
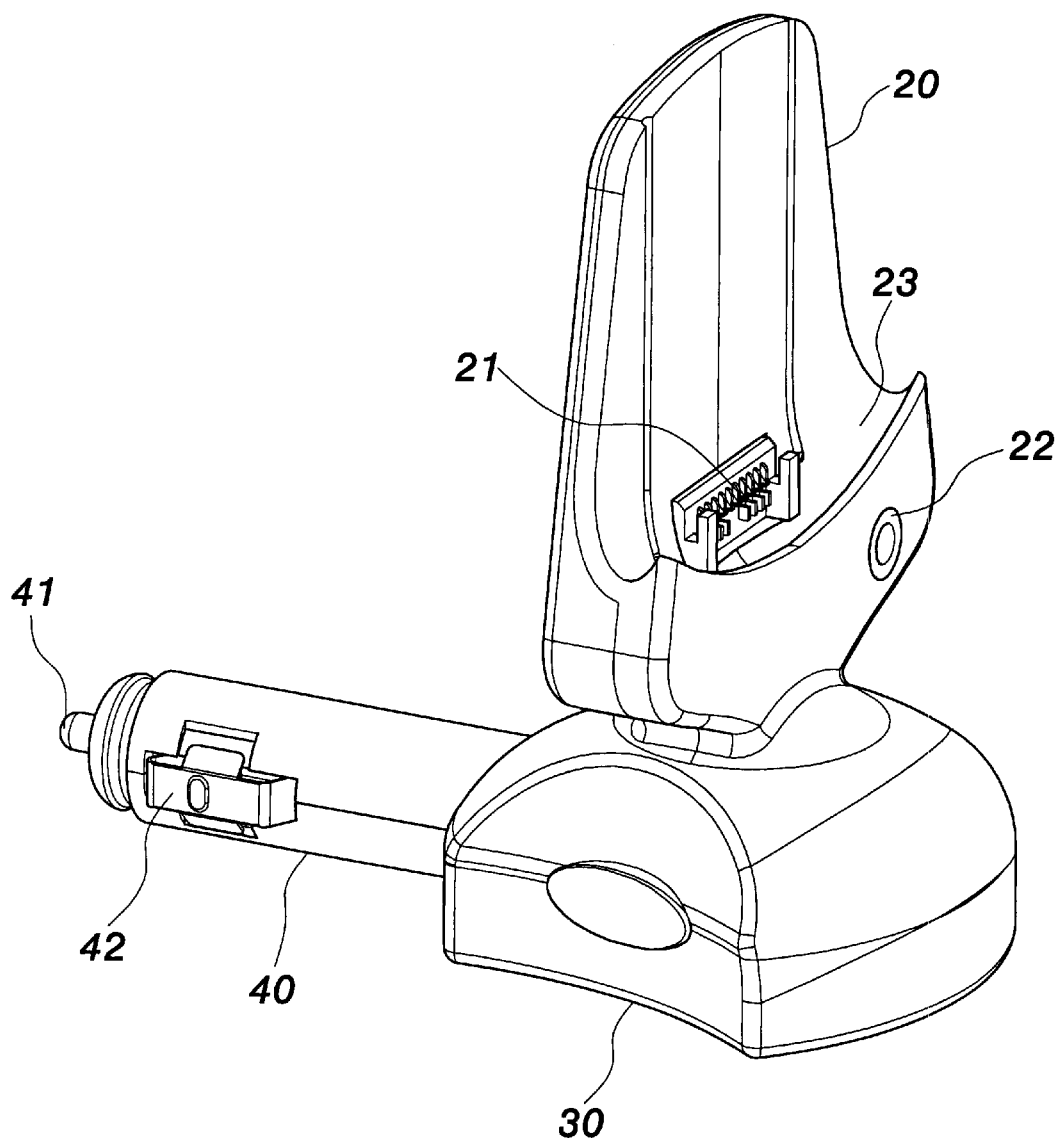
FIG. 3 is a perspective view of the present invention.

The present invention provides a multi-angle placement rack of a personal digital assistant (PDA) for use in an automobile. The placement rack is capable of matching a PDA with various brands and kinds of automobiles to facilitate use. The present invention comprises a placement seat 20, a first main body 30, and a second main body 40, as shown in FIG. 2. The placement seat 20 can be plugged by a PDA (not shown) and can be replaced to match different kinds of PDAs. The placement seat 20 has a conductive terminal 21 disposed at the inner portion of the front side thereof. The conductive terminal 21 can contact a joining groove (not shown) of the PDA to provide required electricity for the PDA. The conductive terminal 21 has also charging function. The placement seat further has a slot 22 to be plugged by an earphone (not shown) matching the PDA to increase driving safety of the user. The placement seat has also a guide groove 23 at the outer side thereof, as shown in FIG. 3. The guide groove 23 can effectively lock or grip the PDA to prevent it from trembling and thus falling off when placed in a moving automobile.

As shown in FIGS. 2 to 5, the placement seat 20 forms a space 24 at the bottom thereof. The space 24 can receive a mobile unit 25, which can be a circular body or a rod body. The space 24 and the mobile unit 25 are used for arbitrary adjustment of position, angle of elevation, and rotation of the placement seat 20, hence facilitating viewing of the PDA for the driver and passengers in the automobile. A screw 26 is disposed below the mobile unit 25. The screw 26 can let the placement seat 20 be detached from the first main body

Figure 4:
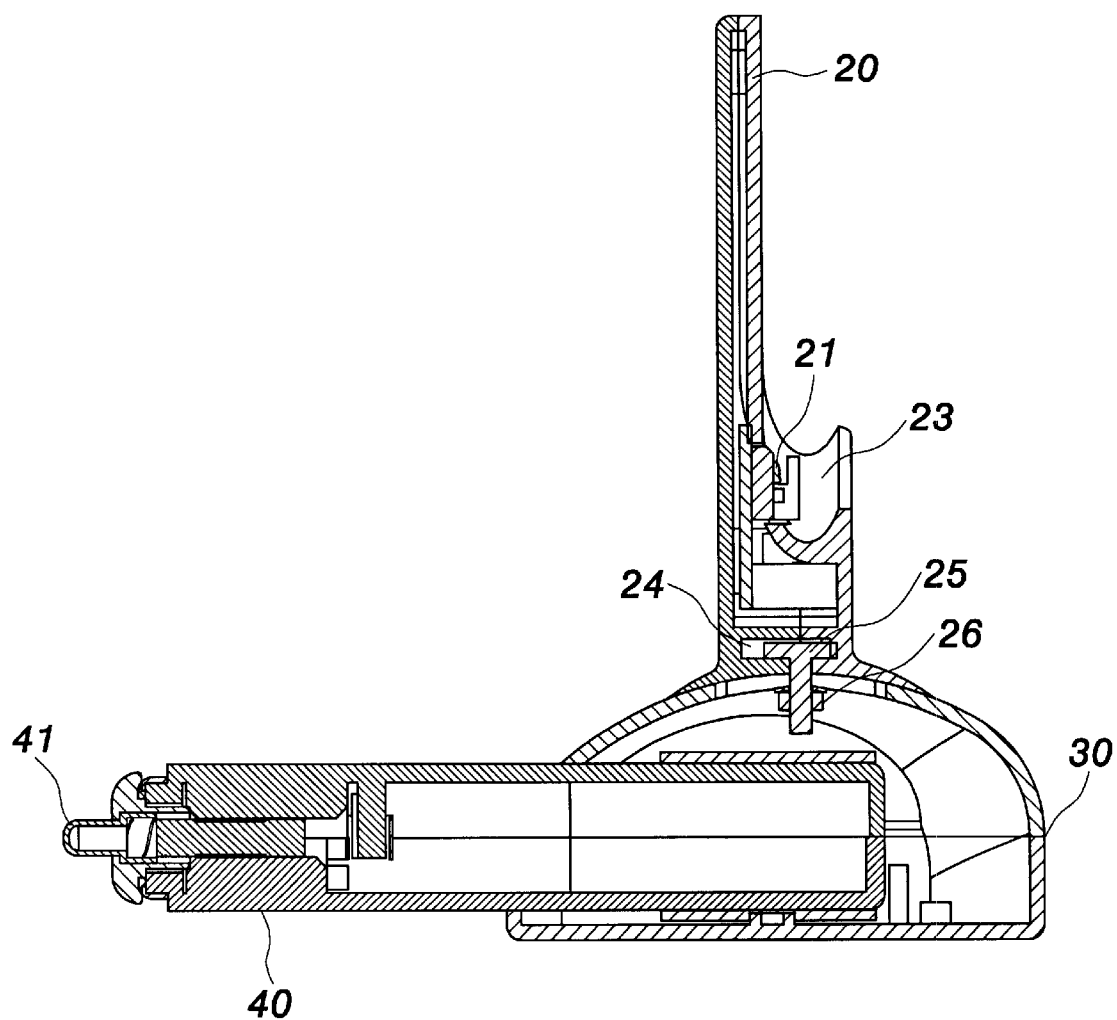
FIG. 4 is a cross-sectional view of the present invention.
Figure 5:
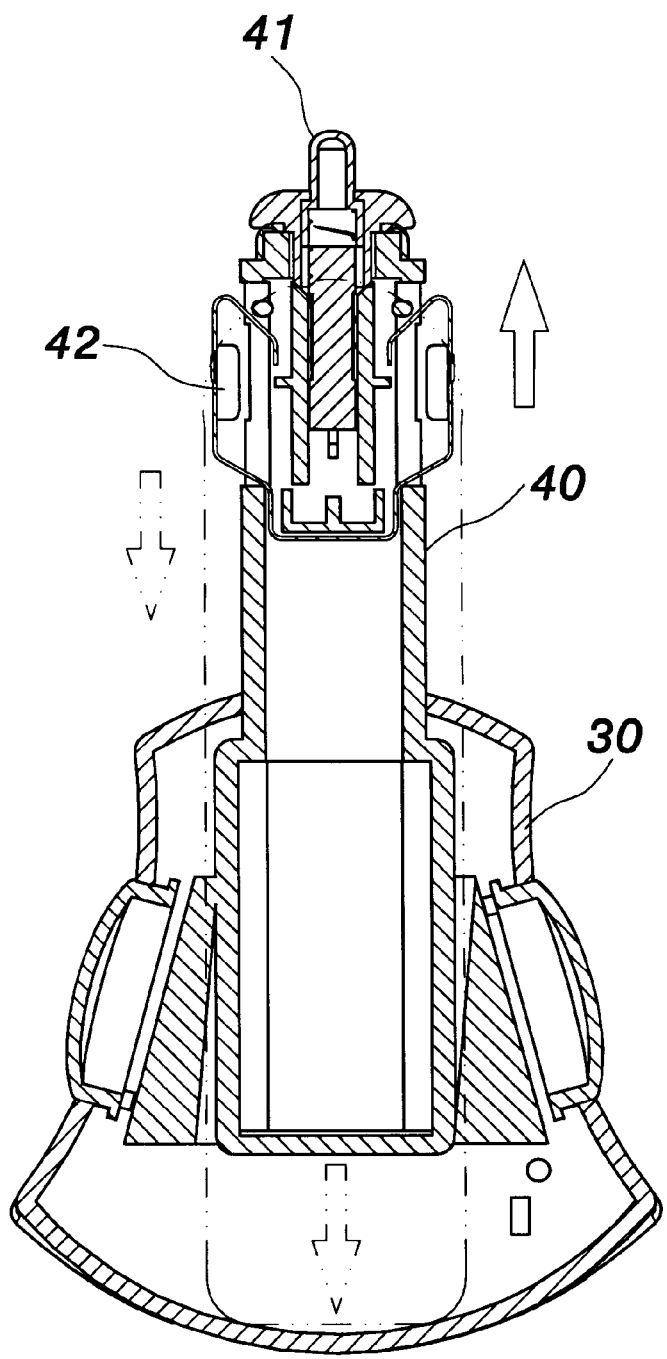
FIG. 5 is an action diagram of the first and second main bodies of the present invention.

30 to facilitate replacement of the placement seat 20 for matching different kinds of PDAs. The bottom of the placement seat 20 joins the first main body 30, which can receive the second main body 40, as shown in FIG. 4. The second main body 40 can slide in the first main body, as shown in FIG. 5. The second main body 40 has a contact bump 41 at one end edge thereof and a contact sheet 42 at either side near the end edge thereof. One side of the second main body 40 can be plugged in a light hole (not shown) in an automobile to let the contact bump 41 and the contact sheets 42 contact with contact terminals (not shown) in the lighter hole, thereby providing required electricity for the PDA. Because the second main body 40 can slide in the first main body 30, the length of the second main body 40 can match lighter holes of various brands and kinds of automobiles. The present invention can achieve convenience of use of PDAs in various brands and kinds of automobiles, hence enhancing its competitive capacity on the market.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A multi-angle placement rack of a personal digital assistant for use in an automobile, comprising:

a placement seat having a conductive terminal therein;

a mobile unit capable of joining said placement seat for adjustment of position, angle of elevation, and rotation of said placement seat;

a first main body joining the bottom of said placement seat; and a second main body joining said first main body, said second main body having a contact bump at one end edge thereof and contact sheets to achieve electric connection when plugged into a lighter hole in an automobile.

2. The multi-angle placement rack of a personal digital assistant for use in an automobile as claimed in claim 1, wherein a screw is disposed below said placement seat to facilitate replacement of said placement seat for matching different kinds of personal digital assistants.

3. The multi-angle placement rack of a personal digital assistant for use in an automobile as claimed in claim 1, wherein said placement seat further has a slot to be plugged by an earphone matching a personal digital assistant.

4. The multi-angle placement rack of a personal digital assistant for use in an automobile as claimed in claim 1, wherein said placement seat has a guide groove at one outer side thereof to fixedly lock or grip a personal digital assistant.

5. The multi-angle placement rack of a personal digital assistant for use in an automobile as claimed in claim 1, wherein said conductive terminal can be used to charge a personal digital assistant.

6. The multi-angle placement rack of a personal digital assistant for use in an automobile as claimed in claim 1, wherein said mobile unit can be a circular body or a rod body to facilitate adjustment of position, angle of elevation, and rotation of a personal digital assistant.

7. The multi-angle placement rack of a personal digital assistant for use in an automobile as claimed in claim 1, wherein said second main body can slide in said first main body.

* * * * *